United States Patent
Turner

[11] 3,846,024
[45] Nov. 5, 1974

[54] OPTICAL ALIGNMENT SYSTEM FOR OPTICAL SPECTROMETERS

[75] Inventor: Arthur Turner, Carlisle, Mass.

[73] Assignee: Baird-Atomic, Inc., Bedford, Mass.

[22] Filed: Feb. 14, 1974

[21] Appl. No.: 442,361

Related U.S. Application Data

[63] Continuation of Ser. No. 262,090, June 12, 1972, abandoned.

[52] U.S. Cl. .................................. 356/80, 356/98
[51] Int. Cl............................. G01j 3/02, G01j 3/18
[58] Field of Search ................. 356/80, 98; 250/552

[56] References Cited
UNITED STATES PATENTS

| | | | |
|---|---|---|---|
| 2,837,959 | 6/1958 | Saunderson et al. | 356/80 |
| 2,937,561 | 5/1960 | Saunderson et al. | 356/80 |
| 3,056,330 | 10/1962 | Saunderson et al. | 356/80 |
| 3,064,520 | 11/1962 | Saunderson et al. | 356/80 |
| 3,499,158 | 3/1970 | Lavine et al. | 250/217 SS |

*Primary Examiner*—John K. Corbin
*Assistant Examiner*—F. L. Evans
*Attorney, Agent, or Firm*—Morse, Altman, Oates & Bello

[57] ABSTRACT

In an optical spectrometer, a pair of solid state light sources, an optical filter, a photo detector, a servo amplifier and a servo motor are provided for maintaining proper alignment of a diffraction grating with respect to a focal curve having entrance and exits slits. The light sources and photo detector are positioned in registration with a vertical entrance slit and a vertical offset exit slit, respectively, the vertical entrance slit and vertical offset exit slit being positioned symmetrically about the normal of the diffraction grating. The light emitted from one of the sources is diffracted by the grating and imaged on the upper portion of the offset exit slit and the light emitted from the other source is diffracted by the grating and imaged on the lower portion of the offset exit slit. The photo detector generates an error signal, the amplitude of which is specified by the difference between the intensity of the light passed through the upper and lower portions of the offset exit slit and the optical filter. The error signal is applied to the servo amplifier having upper and lower threshold limits. The servo amplifier generates a signal which is applied to the servo motor for controlling the alignment of the diffraction grating and focal curve.

12 Claims, 7 Drawing Figures

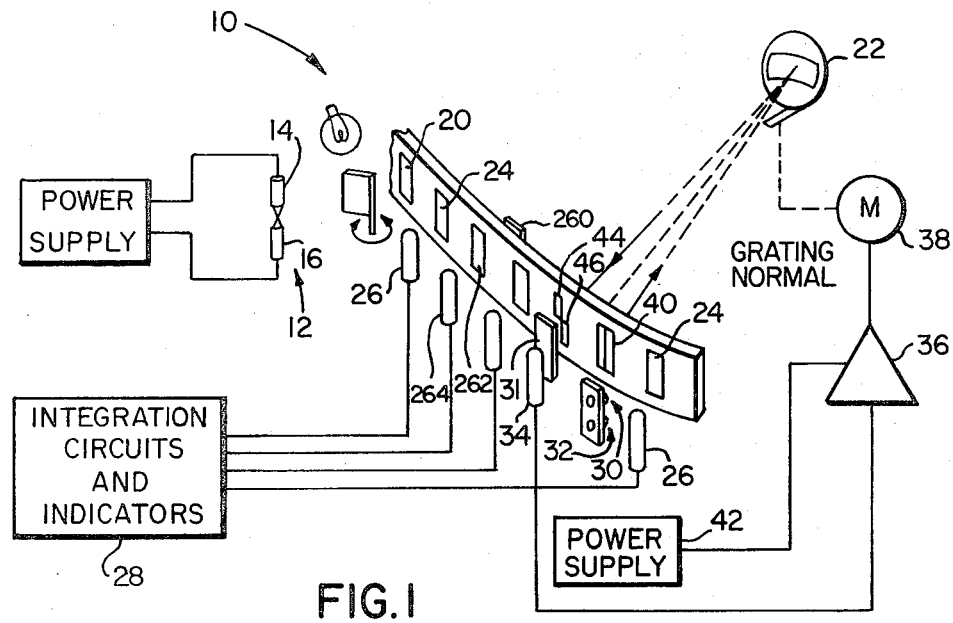
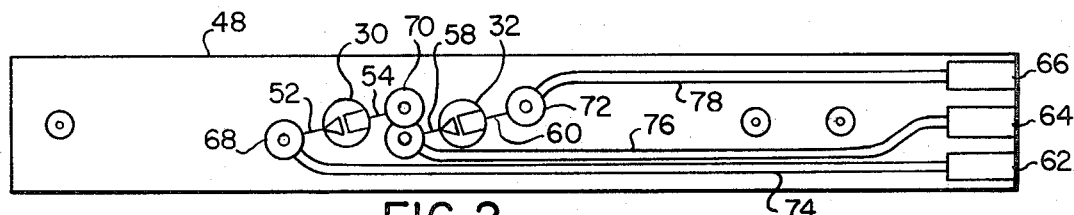
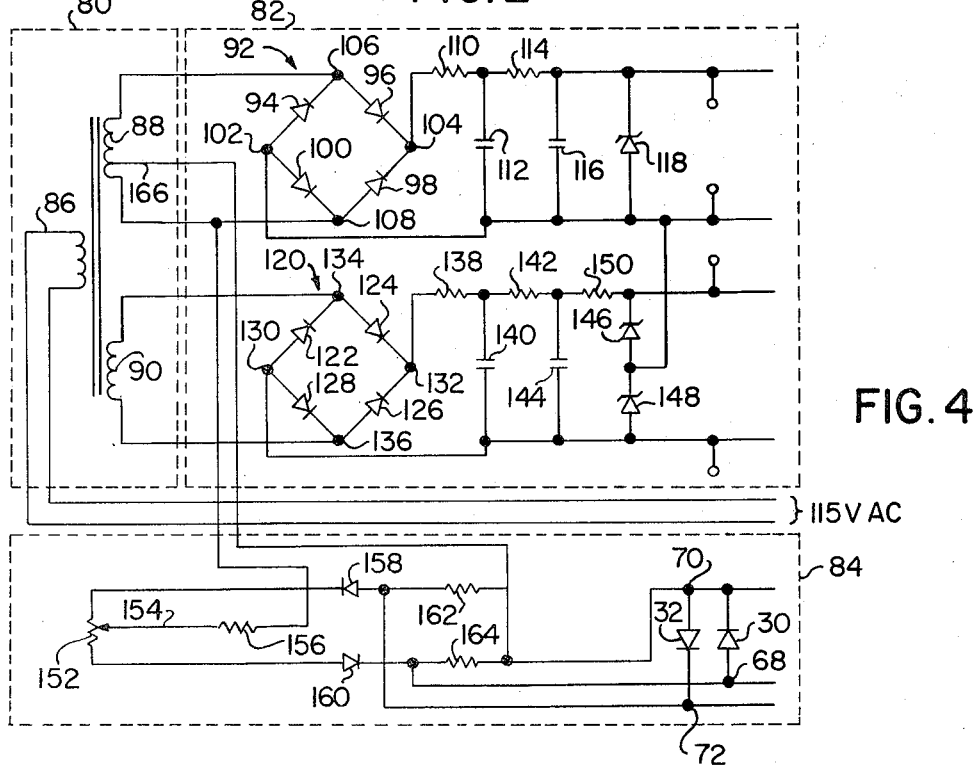
FIG. 1
FIG. 2
FIG. 4

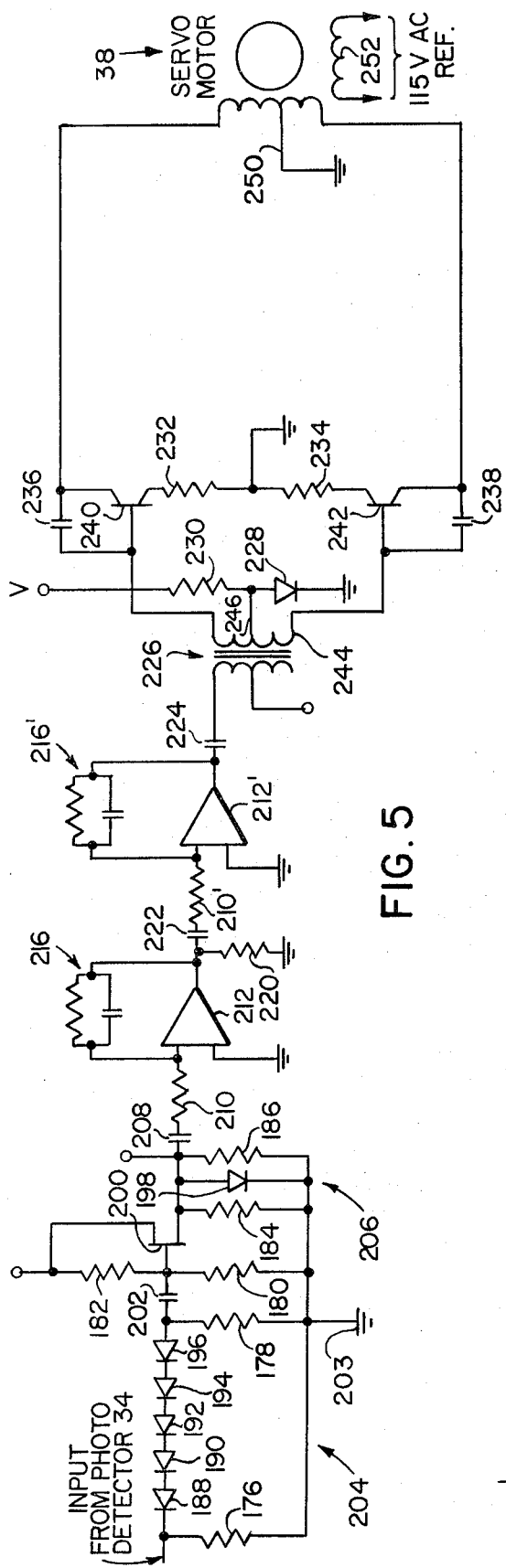
FIG. 5
FIG. 3
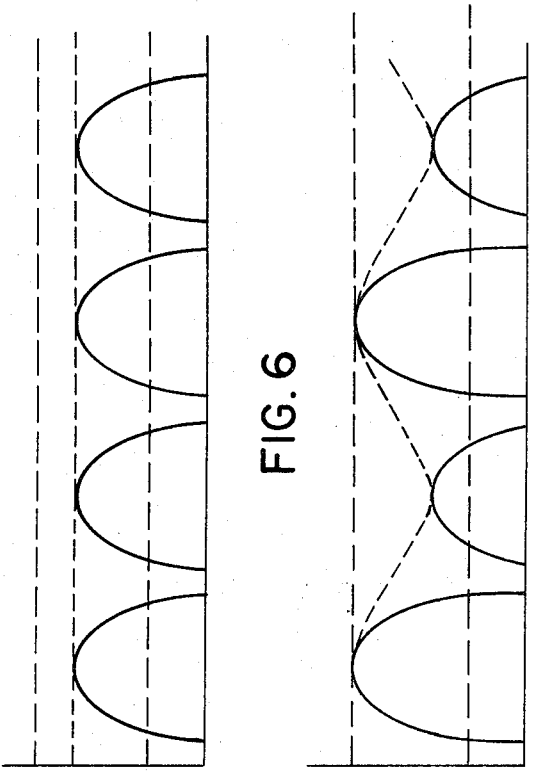
FIG. 6
FIG. 7

OPTICAL ALIGNMENT SYSTEM FOR OPTICAL SPECTROMETERS

This is a continuation of application Ser. No. 262,090, filed June 12, 1972 now abandoned.

BACKGROUND OF THE INVENTION

1. Field of the Invention

The present invention relates generally to optical emission spectrometers and more particularly is directed towards an optical alignment servo system for such spectrometers.

2. Description of the Prior Art:

Generally, optical alignment servo systems are used for aligning direct reading optical emission spectrometers. In one type of servo system a mercury vapor lamp having two glow discharge regions is employed. The intensity of the light emitted from each region is utilized to generate signals representing alignment errors of the spectrometer. Such servo systems have suffered from the disadvantage that the electrodes in the glow regions deteriorate unequally, whereby an unbalance in the intensity of light emitted from the glow regions produces an error signal which results in misalignment among the entrance slits, grating, and exit slits of the spectrometer. In consequence, a spectrum shift is produced which causes errors in the determination of the chemical composition of a specimen under analysis. Furthermore, such prior art servo systems utilize light in the spectral band covered by the spectrometer. In order to prevent the light from interfering with spectrometer operation, the servo system is disabled temporarily while the spectrometer is making a measurement. Accordingly, alignment errors may be introduced while the servo system is inactive or as a result of the turn-off transients.

SUMMARY OF THE INVENTION

It is an object of the present invention to provide an optical alignment servo system, particularly for an optical spectrometer, of independently controlled light beams for maintaining alignement among the enrance slits, grating, and exit slits. The system is characterized by a pair of spatially separated, solid state light sources, an optical filter, a photo detector, a servo amplifier, and a sero motor. The solid state light sources and photo detector are positioned in registration with a vertical entrance slit and a vertical offset exit slit, respectively. The solid state light sources with the entrance slit and the offset exit slit with the photo detector are positioned symmetrically about the normal of spectrometer diffraction grating. Light emitted from the solid state light sources, which are energized sequentially on alternate half cycles of power line voltage, is diffracted and imaged on the offset exit slit, the light from one of the solid state light sources being imaged on an upper aperture of the exit slit and light from the other solid state light source being imaged on a lower aperture of the exit slit. The light passing through the correlative exit slit apertures is filtered and summed in the photo detector which generates an error signal, the amplitude of which represents misalignment among the entrance slits, diffraction grating, and exit slits. The optical filter separates the light emitted by the solid state light sources from ultraviolet signals produced by the spectrometer in its measurement mode, whereby only the light from the solid state light source is received by the photo detector. The vertical entrance slit is positioned at a selected point on the focal curve such that the light emitted by the solid state light sources is diffracted at angles falling outside the spectral range utilized by the spectrometer. Accordingly, the light emitted by the solid state light sources does not interfere with the normal measurement capability to the spectrometer. The error signal is applied to the servo amplifier which generates a drive signal for controlling the servo motor. The combination of two stable light sources, vertical entrance slit, vertical offset exit slit, filter, photo detector, servo amplifier, and servo motor is such as to provide a precision optical alignment servo systems for optical emission spectrometers which does not suffer from the heretofore mentioned disadvantages inherent in prior art systems.

The invention accordingly comprises the system possessing the construction, combination of elements, and arrangement of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein:

FIG. 1 is a perspective of a spectrometer showing significant components of an optical alignment servo system embodying the present invention;

FIG. 2 is a top plan view of a pair of light sources of the system of FIG. 1;

FIG. 3 is a graphical representation of the optical separation of the servo and measurement light at the offset exit slit of FIG. 1;

FIG. 4 is a schematic diagram of the servo and light source power supply of the system of FIG. 1;

FIG. 5 is a schematic diagram of the servo amplifier of the system of FIG. 1; and FIGS. 6 and 7 are graphic representations illustrating the waveforms at the input of the servo amplifier.

DETAILED DESCRIPTION OF THE INVENTION

The mechanical components of the preferred spectrometer are generally indicated at 10 in FIG. 1. In operation, these components are enclosed within a housing which shields its interior from ambient radiation capable of affecting the system now to be described. This system serves to indicate the chemical composition of a specimen by determining the intensity distribution, at selected wavelengths, of radiation emitted by the specimen under excitation in an arc mount assembly 12. In conventional fashion, arc mount assembly 12 comprises a pair of electrodes 14 and 16, for example, in the form of two pins composed of specimen material. Associated with arc mount assembly 12 is a power supply 18 for generating a suitable voltage across the gap between inner ends of electrodes 14 and 16 in order to produce an electrical discharge that is accompanied by characteristic radiation from the specimen. The gap between the inner ends of electrodes 14 and 16 is imaged by an entrance slit 20 on a concave diffraction grating 22 in order to produce a spectrum. Preselected portions of this spectrum, which may be thought of loosely as preselected lines, are directed through respective exit slits 24 to respective photo detectors 26. The intensities of these spectrum lines are indicated by thse photo detectors in association with appropriate integrating circuits 28.

In order to minimize even slight disturbances of the spatial relationship among the various aforementioned components, they are mounted on a sturdy A-shaped frame of the type shown in U.S. Pat. No. 3,056,330, which issued from patent application Ser. No. 9,618, filed on Feb. 18, 1960 in the name of Jason L. Saunderson for "Spectroscopic Apparatus" and assigned to the assignee of this application. Nevertheless, because of the relatively great distance between the grating at one end of this frame and the entrance and exit slits at the other end, small temperature changes tend to disorient the grating with respect to the entrance and exit slits. In accordance with the present invention, proper orientation is ensured by an automatic servo system now to be described.

The servo system comprises a pair of solid state light sources 30 and 32, a filter 33, a photo detector 34, a servo amplifier 36, and a servo motor 38. This servo system is photoelectrically controlled by two beams of light that are emitted by sources 30 and 32. The beams are directed through a vertical entrance slit 40 toward diffraction grating 22, the intensity of each beam being controlled by a power supply 42. Grating 22 directs these beams back through slightly offset upper and lower exit slits 44 and 46 and filter 33 to a photo detector 34. Normally, the servo system is adjusted so that when the grating is properly oriented, the upper and lower beams as shown in dotted lines are transmitted in equal intensity through slits 44 and 46, respectively. In the illustrated embodiment, filter 33 is a long wavelength pass filter, for example a sharp cut-on red glass filter such as that sold by Corning under the trade designation Type 3-67. When the grating becomes improperly oriented, more of one of the beams and less of the other are transmitted through their correlative slits. For example, a slight disorientation of the grating might cause the upper and lower beams to move to the left, as viewed in the drawings, so that the intensity of the beam transmitted through the upper slit would be greater than the intensity of the beam transmitted through the lower slit. The resulting unbalance in the beams intensity is summed in photo detector 34 which generates an error signal. This error signal is applied to servo amplifier 36 which generates a drive signal for controlling servo motor 38. The servo motor is driven in such a direction as to reorient the grating so that the upper and lower beams are transmitted in equal intensity through slits 44 and 46, respectively. The details of light sources 30 and 32, power supply 48, and servo amplifier 36 are shown in FIGS. 2, 3, and 4, respectively.

Referring now to FIG. 2, by way of example, light sources 30 and 32 are shown as a pair of light-emitting diodes which are mounted on a printed circuit board 48. Each light emitting-diode is composed of, for example, PN gallium arsenide phosphide. Diode 30 is provided with a molded lens 50 and a pair of conductors 52, 54, and diode 32 is provided with a molded lens 56 and a pair of conductors 58, 60. Printed circuit board 48 is provided with connectors 62, 64, and 66 and terminals 68, 70, and 72 which are interconnected respectively by means of conductors 74, 76, and 78. That is, conductor 74 electrically connects terminal 68 and connector 66, conductor 76 electrically connects terminal 70 and connector 68, and so on. Conductors 52 and 60 are connected to terminals 68 and 72, respectively, and conductors 54, 58 are connected to terminal 70. Light-emitting diodes 30, 32 are spatially separated with respect to each other and are mounted in registration with slit 40. It is to be understood that in alternative embodiments solid states light sources 30, 32 are other than light-emitting diodes, for example lasers. If the light-emitting diodes or lasers have a spectral band width which is too wide to allow precise control or if the light wavelengths emitted therefrom are not within the range of wavelengths normally analyzed by the spectrometer, the zero order or central image of the diffraction grating is used. That is, light sources 30, 32 with entrance slit 40 and exit slits 44, 46 with photo detector 34 are located symmetrically about the normal of diffraction grating 22. FIG. 3 demonstrates the optical separation at exit slits 44, 46 of the wavelengths emitted by the light-emitting diodes (servo light) and the wavelengths normally analyzed by the spectrometer (measurement light). By way of example, in illustrating the non-interference between the sero light and measurement light, reference is made to the following grating equation:

$m \lambda = d (\sin x + \sin \beta)$ where:
$m$ = integral order of interference
$\lambda$ = transmitted wavelength
$d$ = grating constant
$\sin x$ = angle of incidence
$\sin \beta$ = angle of diffraction Solving for $\sin \beta$ yields the following $\sin \beta = m \lambda/d - \sin x$ In the illustrated embodiment, by way of example, substituting the following values $d = 1667 A$
$\lambda = 6300 A$
$\sin x = .05$ radian into the equation for $\sin \beta$ yields:

$\sin \beta = m (6300A)/1667A - .05$
$\sin \beta = -.05$ when $m = 0$

From the foregoing, it will be readily appreciated that, by appropriate choice of angles in the grating equation, servo light returns to the focal curve in zero order and does not interfere with the measurement optics. In consequence, servo operation is continuous and uninterupted during sample analysis. As hereinafter described, the light sources 30, 32 are energized sequentially on alternate half cycles of power line voltage which is applied to power supply 42.

As best illustrated in FIG. 4, power supply 42 comprises a transformer 80, a rectifier and filter circuit 82, and a balance circuit 84. Transformer 80 and rectifier and filter circuit 82 are used for generating voltages for servo amplifier 36 and balance circuit 84 is provided for controlling the relative intensity of light emitted from diodes 30 and 32. The power line voltage, for example 115V AC, is applied to a primary winding 86 of transformer 80 and is coupled to secondary windings 88, 90. One side of secondary winding 88 is connected to one side of a rectifying circuit 92 having diodes 94, 96, 98 and 100. The anode of diodes 94, 100 and the cathode of diodes 96, 98 are connected to junctions 102 and 104 respectively. The cathode of diode 94 and the anode of diode 96 are joined at a junction 106 and the cathode of diode 100 and the anode of diode 98 are joined at a junction 108, the other side of secondary winding 88 being connected to junction 108. A resistor 110 and a capacitor 112 are connected between junctions 102 and 104, resistor 110 and capacitor 112 being connected in series. A resistor 114 and a capacitor 116 are connected serially across capacitor 112, one side of resistor 114 being connected to the junction of resistor 110 and capacitor 112. A zener diode 118 is connected in parallel with capacitor 116, the anode of diode 118 being connected to junction 102. One side of secondary winding 90 is connected to one side of a rectifying circuit 120 having diodes 122, 124, 126, and 128. The anode of diodes 122, 128 and the cathode of diodes 124, 126 are connected to junctions 130 and 132, respectively. The cathode of diode 122 and the anode of diode 124 are joined at a junction 134 and the cathode of diode 128 and the anode of diode 130 are joined at a junction 136, the other side of secondary winding 90 being connected to junction 136. A resistor 138 and a capacitor 140 are connected between junctions 130 and 132, resistor 138 and capacitor 140 being connected in series. A resistor 142 and a capacitor 144 are connected serially across capacitor 140, one side of resistor 142 being connected to the junction of resistor 138 and capacitor 140. A pair of serially connected zener diodes 146 and 148 are connected in parallel with capacitor 144, the anode of diode 146 being connected to the cathode of diode 148. The junction of resistor 142 and capacitor 144 is connected to the cathode of diode 146 by means of a resistor 150, the other side of capacitor 144 and the anode of diode 148 being joined. The common junction of diodes 146 and 148 is connected to junction 102. Junction 108 is connected also to balance circuit 84.

Balance circuit 84 comprises a variable resistor 152 having a wiper arm 154 which is connected to junction 108 by means of a resistor 156. One side of resistor 152 is connected to the cathode of a diode 158 and the other side of resistor 152 is connected to the anode of a diode 160. The anode of diode 158 is connected to connector 64 by means of a resistor 162 and connected directly to connector 66. The cathode of diode 160 is connected to connector 64 by means of a resistor 164 and connected directly to connector 62. Connector 64 is connected further to an appropriate tap 166 of secondary winding 88.

Referring now to FIG. 5, servo amplifier 36 comprises an input stage 168, a pair of amplifier stages 170 and 172, and a push pull power stage 174 which is connected to servo motor 38. Input stage 168 receives an error signal from photo detector 34, push pull power stage 174 generates a drive signal for controlling servo motor 38.

Input stage 168 includes resistors 176, 178, 180, 182, 184, and 186; diodes 188, 190, 192, 194, 196, and 198; a field effect transistor 200; and a capacitor 202. One side of each resistor 176, 178, 180, 184, and 186 and the cathode of diode 198 are connected to a common ground 203. Diodes 188, 190, 192, 194, and 195 are connected serially between the other side of resistors 176 and 178, the cathode of diode 188 and the anode of diode 196 being connected to resistors 176 and 178, respectively. The anode of diode 196 is AC coupled by means of capacitor 202 to the gate of field effect transistor 200, which is further connected to the other side of resistor 180. The source and gate of field effect transistor are joined through bias resistor 182. The drain of field effect transistor 200 is connected to the other side of resistors 184 and 186 and the anode of diode 198.

Input stage 168 provides upper and lower threshold levels for the signal received from photo detector 34 which is applied at the junction or resistor 176 and diode 188, reference characters 204 and 206 denoting the components defining the upper and lower threshold levels, respectively.

Amplifier stage 170 is AC coupled to input stage 168 by means of a capacitor 208. A resistor 210 is connected serially between capacitor 208 and an input terminal 212 of an operational amplifier 214. A parallel RC circuit 216 is connected between input 212 and an output terminal 218 of amplifier 214. A resistor 220 is connected between output terminal 218 and ground. Amplifier stage 170 is AC coupled to amplifier stage 172 by means of a capacitor 222. Since amplifier stage 172 is similar to amplifier stage 170, like components are given like reference designations, amplifier stage 172 being distinguished by primed reference characters. Amplifier stage 172 is coupled to push pull power stage 174 by means of a capacitor 224.

Push pull power stage 174 comprises a transformer 226; a diode 228; resistors 230, 232, and 234; capacitors 236 and 238; and transistors 240 and 242. One side of a secondary winding 244 of transformer 226 is connected to the base of transistor 240 and the other side is connected to the base of transistor 240. An appropriate tap 246 of secondary winding 244 is connected to the junction of resistor 230 and the anode of diode 228. The anode of diode 228 is connected to ground and the other side of resistor 230 is connected to a voltage V. Capacitors 236 and 238 are connected between the collector and base of transistors 240 and 242, respectively. The emitters of transistors 240 and 242 are joined by means of serially connected resistors 232 and 234, the junction of resistors 232 and 234 being connected to ground. The collectors of transistors 240 and 242 are connected respectively to opposite sides of a field winding 248 of servo motor 38, an appropriate tap 250 of winding 248 is connected to ground. A reference voltage, for example 115V AC is applied to a second field winding 252. RC networks 216 and 216' shift the waveform in winding 248 into a 90° out-of-phase relationship with respect to the waveform in winding 252.

As indicated above, light beams from light-emitting diodes 30 and 32, which are energized sequentially on alternate half cycles of the power line voltage, are directed through slit 40 and are diffracted by grating 22 toward upper and lower slits 44 and 46. Since the slits are offset, there is one orientation of the beams at which the amount of radiation directed through the upper slit is exactly equal to the amount of radiation transmitted through the lower slit. In the illustrated embodiment of the invention, an auxilliary system 254 is provided for initial orientation of the spectrometer.

In order to initially orient the spectrometer alignment, a beam from a source 256, for example a mercury vapor discharge tube, is reflected by a mirror 258 and is directed through slit 20. Mirror 258 is rotatably mounted on a shaft 260 in such a manner that during the analysis phase of the spectrometer mirror 258 is rotated out of the line-of-sight between arc mount assembly and slit 20 and during the initial alignment phase of the servo system mirror 258 is rotated in the line-of-sight between arc mount assembly and slit 20. Mirror 258 is oriented in such a manner that the beam from discharge tube 256 and the specimen radiation are directed along the same path through slit 20 toward grating 22. The beam from tube 256 is diffracted by grating 22 and is directed through a lens 260 toward an exit slit 262. In registration with slit 262 is a photo detector 264 which generates a signal indicative of spectrometer alignment. The spectrometer is aligned so that entrance slit 20 is imaged on exit slit 262. Once the proper orientation of the spectrometer is established, light-emitting diodes 30 and 32 are energized and balance circuit 84 is adjusted.

Referring now to FIG. 4, it will be realized that diodes 158 and 160 are provided for sequentially energizing light-emitting diodes 30 and 32 on alternate half cycles of the power line voltage and resistor 152 is provided for controlling the relative intensities of the light emitted from diodes 30, 32. Using the previously established orientation of the spectrometer as a guide, wiper arm 154 is adjusted so that the beams from light-emitting diodes 30 and 32 which are directed through upper and lower slits 44 and 46, respectively, are equal in intensity as measured by photo detector 34 which generated a signal proportional to the difference between the beam intensities.

As hereinafter described in detail, the proper alignment of the spectrometer is maintained by photoelectrically controlling the orientation of the grating with respect to the slits. The beams from light-emitting diodes 30 and 32 are directed through slit 40 toward grating 22 which diffracts the beams toward upper and lower offset slits 44 and 46. Since the slits are offset, there is one orientation of the beams at which the amount of radiation directed through the upper slit is exactly equal to the amount of radiation transmitted through the lower slit. It is to be remembered that balance circuit 84 was adjusted so that the amount or radiation transmitted through these slits was exactly equal as indicated by photo detector 34. If the beams are in any other orientation, either the radiation transmitted through the lower slit or the radiation transmitted through the upper slit will be greater in intensity. In response to the two beams, photo detector 34 generates a succession of electrical pulses which are equal in magnitude, as shown in FIG. 6, when the beams are properly oriented and alternate pulses which are unequal in magnitude, as shown in FIG. 7, when the beams are improperly oriented. Photo detector 34 is connected through input stage 168 to amplifier stages 170 and 172 and push pull power stage 174.

The operation of servo amplifier 26 is such that when the alternate pulses generated by photodetector 34 are equal in magnitude, the waveform in winding 248 will be a succession of pulses of equal amplitude having a non-varying envelope, the succession of pulses corresponding in time with the positive and negative half cycles of the input power waveform. The rotor of servo motor 38 is thereby subjected successively to equal opposite forces with the result that it remains stationary. However, when the alternate pulses from the photo detector 34 have a varying envelope, i.e., pulses of unequal magnitude, a similar inequality will exist in the waveform of winding and the pulses of greater amplitude will correspond with either the positive or negative half cycles of the power input waveform. Because the waveform in winding 248 is 90° out-of-phase with the power input waveform, the rotor of servo motor 38 will rotate. The direction of rotation will be determined by whether the pulse of greater amplitude in winding 248 coincides with the positive or negative half cycles of the power input waveform. This direction is determined by whether the beam transmitted through slit 44 or the beam transmitted through slit 46 is of the greater intensity.

The present invention thus provides a simple but efficacious servo system for automatically controlling the orientation of a grating or the like with respect to input and output optical components spaced therefrom.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A spectroscopic apparatus comprising:
   a. first means for exciting a chemical sample to emit characteristic radiation;
   b. second means for directing said characteristic radiation along a first optical path;
   c. third means for diffracting said characteristic radiation from said first optical path into a spectrum;
   d. fourth means for reading said spectrum;
   e. a pair of solid state light sources mounted on a circuit board, said solid state light sources spatially separated with respect to each other, said solid state light sources having alternatively bright regions when subjected to an alternating voltage for emitting monitor radiation, said solid state light sources energized sequentially on alternate half cycles of said alternating voltage;
   f. an entrance slit in registration with said pair of light sources for directing said monitor radiation from each said source along a second optical path toward said third means, said monitor radiation diffracted at angles falling outside the spectral range normally utilized by the spectroscopic apparatus;
   g. an offset exit slit for said monitor radiation diffracted by said third means;
   h. photo detector means in registration with said exit slit for receiving said monitor radiation from said exit slit in order to produce signals of a character that depends upon the orientation of said third means with respect to said entrance and exit slits;
   i. filter means interposed between said exit slit and photo detector means for optically separating said diffracted characteristic radiation from said monitor radiation; and
   j. fifth means responsive to said signals produced by said photo detector means for controlling the relative orientations of said third means with respect to said entrance and exit slits.

2. The spectroscopic apparatus as claimed in claim 1 wherein each said solid state light source is a light-emitting diode.

3. The spectroscopic apparatus as claimed in claim 1 wherein said filter means is a sharp cut on red glass filter.

4. The spectroscopic apparatus as claimed in claim 1 wherein said third means is a diffraction grating and wherein said light sources with said entrance slit and said exit slit with said photo detector means are positioned symmetrically about the normal of said diffraction grating.

5. The spectroscopic apparatus as claimed in claim 1 wherein said fifth means includes;
   a. servo amplifier means electrically connected to said photo detector means for generating a drive signal which depends upon the orientation of said third means with respect to said entrance and exit slits;
   b. power supply means operatively connected to said light sources and servo amplifier means, said power supply means having balance means for controlling the relative intensity of the monitor radiation emitted from said light sources; and
   c. servo motor means electrically connected to said servo amplifier means and operatively connected to said third means, said servo motor being responsive to said drive signals for controlling the relative orientations of said third means with respect to said entrance and exit slits.

6. The spectroscopic apparatus as claimed in claim 5 wherein said servo amplifier means includes:
   a. first threshold means defining an upper level for said signal produced by said photo detector means; and
   b. second threshold means defining a lower level for said signals produced by said photo detector means.

7. A spectrometer for indicating the chemical composition of a specimen by determining the intensity distribution, at selected wavelengths, of radiation emitted by the specimen under excitation, said spectrometer comprising:
   a. first means for exciting the specimen to emit characteristic radiation;
   b. second means for directing said characteristic radiation along a first optical path;
   c. grating means for diffracting said characteristic radiation from said first optical path into a spectrum;
   d. third means for reading said spectrum;
   e. a pair of solid state light sources mounted on a circuit board, said solid state light sources spatially separated with respect to each other, said solid state light sources having alternatively bright regions when subjected to an alternating voltage for emitting monitor radiation, said monitor radiation having a wavelength out of the range of wavelengths normally analyzed by the spectrometer apparatus;
   f. an entrance slit in registration with said pair of light sources for directing said monitor radiation from each said source along a second optical path toward said grating means, said monitor radiation diffracted at angles falling outside the spectral range normally utilized by the spectrometer;
   g. an offset exit slit for said monitor radiation diffracted by said grating means, said monitor radiation diffracted at an angle falling outside the spectral range of said characteristic radiation;
   h. photo detector means in registration with said exit slit for receiving said monitor radiation from said exit slit in order to produce signals of a character that depends upon the orientation of said grating means with respect to said entrance and exit slits, said light sources with said entrance slit and said exit slit with said photo detector means are positioned symmetrically about the normal of said grating means; and
   i. fourth means responsive to said signals produced by said photo detector means for controlling the relative orientations of said grating means with respect to said entrance and exit slit means.

8. The spectrometer as claimed in claim 7 wherein each said light source is a light-emitting diode.

9. The spectrometer as claimed in claim 8 wherein each said light-emitting diode is composed of PN gallium arsenide phosphide.

10. In combination with a diffraction grating, a system for automatically and predeterminedly orienting said diffraction grating with respect to entrance and exit slits, radiation from a specimen under excitation directed through the entrance slit and diffracted by said diffraction grating through said exit slits, said system comprising:
   a. a pair of solid state light sources mounted on circuit board means, said solid state light sources spatially separated with respect to each other, each said source characterized by regions which emit monitor radiation;
   b. an entrance slit in registration with said pair of light sources for directing said monitor radiation from said sources toward the diffraction grating, said monitor radiation diffracted at an angle falling outside the spectral range of the specimen radiation;
   c. an offset exit slit for said monitor radiation transmitted through said entrance slit from said sources and diffracted by the grating;
   d. photo detector means in registration with said offset exit slit for receiving said radiation from said offset exit slit in order to produce signals of a character that depends upon the orientation of said diffraction grating with respect to the entrance and exit slits; and
   e. means responsive to said signals produced by said photo detector means for controlling the relative orientations of the grating with respect to said entrance and exit slits.

11. The system as claimed in claim 10 wherein said second entrance slit and said offset exit slit are positioned symmetrically about the normal of the grating.

12. The system as claimed in claim 10 including filter means interposed between said offset exit slit and photo detector means for optically separating said specimen radiation and monitor radiation.

* * * * *